(12) United States Patent
Matsui et al.

(10) Patent No.: US 7,117,340 B2
(45) Date of Patent: Oct. 3, 2006

(54) STORAGE SYSTEM CONTROL METHOD, STORAGE SYSTEM, AND STORAGE APPARATUS

(75) Inventors: Yuko Matsui, Odawara (JP); Koji Nagata, Oi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/274,341

(22) Filed: Nov. 16, 2005

(65) Prior Publication Data

US 2006/0064544 A1 Mar. 23, 2006

Related U.S. Application Data

(63) Continuation of application No. 10/655,004, filed on Sep. 5, 2003, now Pat. No. 7,013,380.

(30) Foreign Application Priority Data

Jun. 2, 2003 (JP) .............................. 2003-156370

(51) Int. Cl.
*G06F 12/00* (2006.01)
(52) U.S. Cl. ..................... 711/209; 711/161; 711/203
(58) Field of Classification Search ................ 711/161, 711/203, 209
See application file for complete search history.

(56) References Cited

U.S. PATENT DOCUMENTS 7,013,380 B1 * 3/2006 Matsui et al. ................ 711/209

| | | | |
|---|---|---|---|
| 2002/0029319 A1 | 3/2002 | Robbins et al. | 711/114 |
| 2002/0103913 A1 | 8/2002 | Tawil et al. | 709/229 |
| 2003/0145041 A1* | 7/2003 | Dunham et al. | 709/203 |
| 2003/0149736 A1 | 8/2003 | Berkowitz et al. | 709/213 |
| 2003/0200399 A1 | 10/2003 | Dawkins et al. | 711/152 |
| 2004/0162921 A1 | 8/2004 | Teow et al. | 710/10 |
| 2004/0172510 A1 | 9/2004 | Nagashima et al. | 711/114 |

FOREIGN PATENT DOCUMENTS

JP 2001-265655 9/2001

* cited by examiner

*Primary Examiner*—Reba I. Elmore
(74) *Attorney, Agent, or Firm*—Mattingly, Stanger, Malur & Brundidge, P.C.

(57) ABSTRACT

A method controls a storage system including a first storage apparatus including a first storage volume to store data therein, a second storage apparatus including a second storage volume to store data therein, the first and second storage apparatuses being communicably connected, and an information processor communicably connected to the first storage apparatus. The method includes the steps of transmitting by the information processor an identifier to identify the second storage volume in the second storage apparatus to the first storage apparatus, describing by the first storage apparatus the identifier in a data input/output request for the second storage volume and transmitting the data input/output request to the second storage apparatus, and executing by the second storage apparatus data input/output processing for the second storage volume identified by the identifier described in the data input/output request.

14 Claims, 7 Drawing Sheets

FIG.5

LU MAPPING TABLE (216)

| WWN | EXTERNAL LUN | INTERNAL LUN |
|---|---|---|
| WWN02 | LUB11 | LU13 |
|  | LUB12 | LU12 |
| WWN11 | LUA11 | LU11 |
|  | LUA12 | LU12 |
|  |  |  |

DIFFERENCE CONTROL TABLE

STORAGE SYSTEM CONTROL METHOD, STORAGE SYSTEM, AND STORAGE APPARATUS

CROSS-REFERENCE TO RELATED APPLICATION

The present application is a continuation of application Ser. No. 10/655,004, filed Sep. 5, 2003 now U.S. Pat. No. 7,013,380 and is related to Japanese Patent Application No. 2003-156370 filed on Jun. 2, 2003, the contents of which are incorporated herein by reference.

BACKGROUND OF THE INVENTION

The present invention relates to a storage system control method, a storage system, and a storage apparatus.

Recently, there has been developed a technique called "remote copy". The remote copy is used to continuously conduct jobs by a computer system in a remote site even when a computer system in a main site stops at occurrence of a disaster caused by, for example, a strong earthquake. The remote copy is a technique to store in a storage volume of a storage apparatus in the remote site a copy or replica of data stored in a storage volume of a storage apparatus in the main site.

On the other hand, to efficiently use a large capacity of storage resources of a storage apparatus, there has been commonly used a configuration to share the storage apparatus among a plurality of information processors. In this case, to guarantee security of data stored in the shared storage apparatus, a technique called "logical unit number (LUN) masking" is employed to beforehand allocate storage volumes to respective information processors. Generally, to identify in a storage apparatus each storage volume thereof, it is possible to use a global identifier uniquely assigned to the storage volume. However, when the LUN masking is used, the identifiers assigned to the storage volumes of each information processor may become discontinuous numbers in some cases. Therefore, in a storage apparatus using the LUN masking, logical identifiers are assigned to storage volumes for each information processor. As a result, when a data input/output request is issued to a storage apparatus, each information processor can identify the storage volume using the local identifier assigned thereto.

In this situation, to use the remote copy, the storage apparatus installed in the main site sends a data input/output request to the storage apparatus installed in the remote site. In the prior art, there does not exit a technique for the storage apparatus in the main site to acquire an identifier locally assigned thereto to identify the storage volume in the remote site. Therefore, the storage apparatus in the main site sends a data input/output request to the storage apparatus in the remote site using a global identifier.

On the other hand, the number of storage volumes is increasing in one storage apparatus. For example, a large-sized storage apparatus includes thousands of storage volumes. Therefore, many bits are required to describe a global identifier in a data input/output request to be sent to the storage apparatus installed in the remote site. However, such a large number of bits are not available for the data input/output request standardized, for example, by the small computer systems interface (SCSI). Therefore, in the remote copy of the prior art, a remote copy command unique to the maker or producer of the storage apparatus is used for each unit or machine type of the storage apparatus.

As above, a remote copy unique to each machine type is conducted in the prior art. It has not been taken into consideration that the remote copy is conducted between storage apparatuses of mutually different unit types and between storage apparatuses of mutually different producers.

SUMMARY OF THE INVENTION

It is therefore an object of the present invention, which has been devised to remove the problem, to provide a storage system control method, a storage system, and a storage apparatus.

To achieve the object according to one feature of the present invention, there is provided a storage system control method of controlling a storage system including a first storage apparatus including a first storage volume to store data therein, a second storage apparatus including a second storage volume to store data therein, the second storage apparatus being communicably connected to the first storage apparatus, and an information processor communicably connected to the first storage. The method comprises the steps of: transmitting by the information processor an identifier to identify the second storage volume in the second storage apparatus to the first storage apparatus, describing by the first storage apparatus said identifier in a data input/output request for the second storage volume and transmitting said data input/output request to the second storage apparatus, and executing by the second storage apparatus data input/output processing for the second storage volume specified by said identifier described in the data input/output request.

In the description, "storage apparatus" is a storage apparatus including a disk drive. "Disk drive" is a device including a recording medium to record data thereon, for example, a hard disk device or a semiconductor memory device. "Storage volume" is a storage resource including a physical volume as a physical storage area of disk drive and a logical volume as a storage area logically set in the physical volume. "Identifier" is a logical unit number (LUN) specified, for example, by the SCSI standard. Moreover, "data input/output request" is a write command specified, for example, by the SCSI standard.

Additionally, problems and methods of solving the same described in the present application will become apparent through description of embodiments and drawings of the present invention.

According to the present invention, there can be provided a storage system control method, a storage system, and a storage apparatus which makes a data copy possible between storage apparatuses having mutually different functions.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram for explaining an LU mapping table in the embodiment;

DESCRIPTION OF THE EMBODIMENTS

Figure 1:
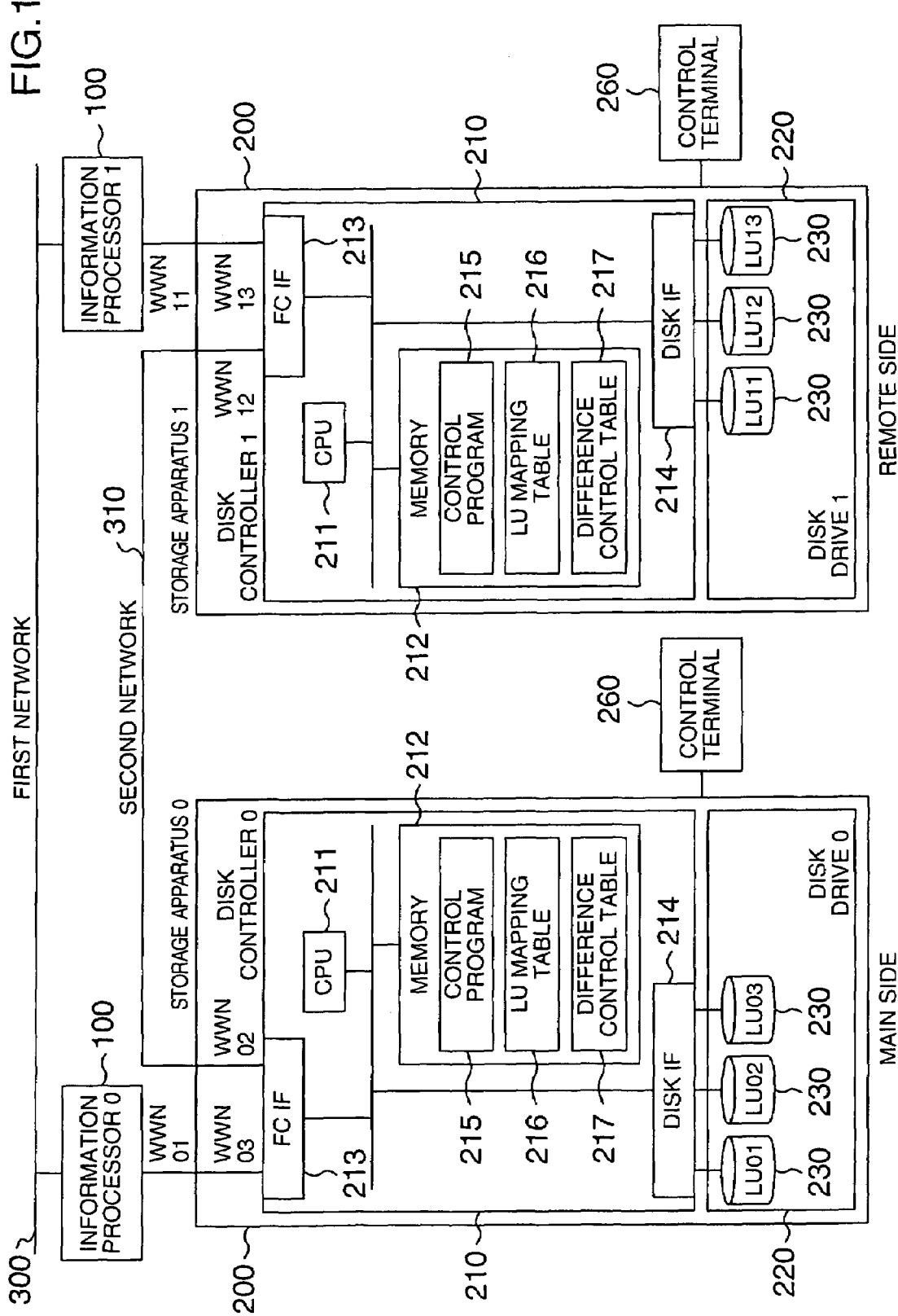
FIG. 1 is a block diagram showing an overall configuration of an embodiment of a storage system according to the present invention.

Referring now to the drawings, description will be given in detail of an embodiment of the present invention.

Overall Configuration

FIG. 1 shows in a block diagram an overall configuration of an embodiment of a storage system according to the present invention.

The embodiment of a storage system of the present invention includes an information processor 0 (100) and a storage apparatus 0 (a first storage apparatus) (200), and an information processor 1 (100) and a storage apparatus 1 (a second storage apparatus) (200).

The information processor 0 (100) is a computer which provides various information processing services by using storage or memory resources of the storage apparatus 0 (200). Th information processing services of the information processor 0 (100) include, for example, an automatic deposit and withdrawal service of a bank and a seat reserving service of an airplane. The information processor 0 (100) and the storage apparatus 0 (200) are installed in a place called "main site".

On the other hand, the information processor 1 (100) is a computer which takes over, when the information processor 0 (100) installed in the main site enters a state not capable of providing the information processing services due to, for example, occurrence of a disaster, duties of the information processing services from the information processor 0 (100) and which provides the services in place thereof. In the operation, the information processor 1 (100) achieves the information processing services using the storage resources of the storage apparatus 1 (200). For this purpose, the storage apparatus 1 (200) stores a replica or a copy of data stored in the storage apparatus 0 (200). A remote copy is conducted to store the replica of data stored in the storage apparatus 0 (200) in the storage apparatus 1 (200). Therefore, when the information processor 0 (100) updates data stored in the storage apparatus 0 (200), a replica thereof is reflected in the storage apparatus 1 (200). The information processor 1 (100) and the storage apparatus 1 (200) are installed in a place called "remote site".

In this connection, the information processor 1 (100) conducts not only the information processing services in place of the information processor 0 (100), but can also provide its own information processing services depending on from case to case. In this case, for example, when the information processing services of the information processor 1 (100) cannot be provided due to a disaster taking place in the remote site, it is also possible that the information processor 0 (100) conducts the services in place of the information processor 1 (100).

The information processor 0 (100) in the main site and the information processor 0 (100) in the remote site are connected via a first network 300 for communication therebetween. The storage apparatus 0 (200) in the main site and the storage apparatus 1 (200) in the remote site are connected via a second network 310 for communication therebetween. The remote copy is conducted via the second network 310.

The first network 300 may be a local area network (LAN) for communication according to, for example, a communication protocol of "transmission control protocol/internet protocol (TCP/IP).

The second network 310 may be a storage area network (SAN) for communication according to, for example, a fibre channel communication protocol. The connection between the information processor 0 (100) and the storage apparatus 0 (200) and that between the information processor 1 (100) and the storage apparatus 1 (200) are also implemented by SAN for communication according to a fibre channel communication protocol. Moreover, it is also possible to use a communication protocol such as an internet small computer systems interface (iSCSI).

Information Processor

Figure 2:
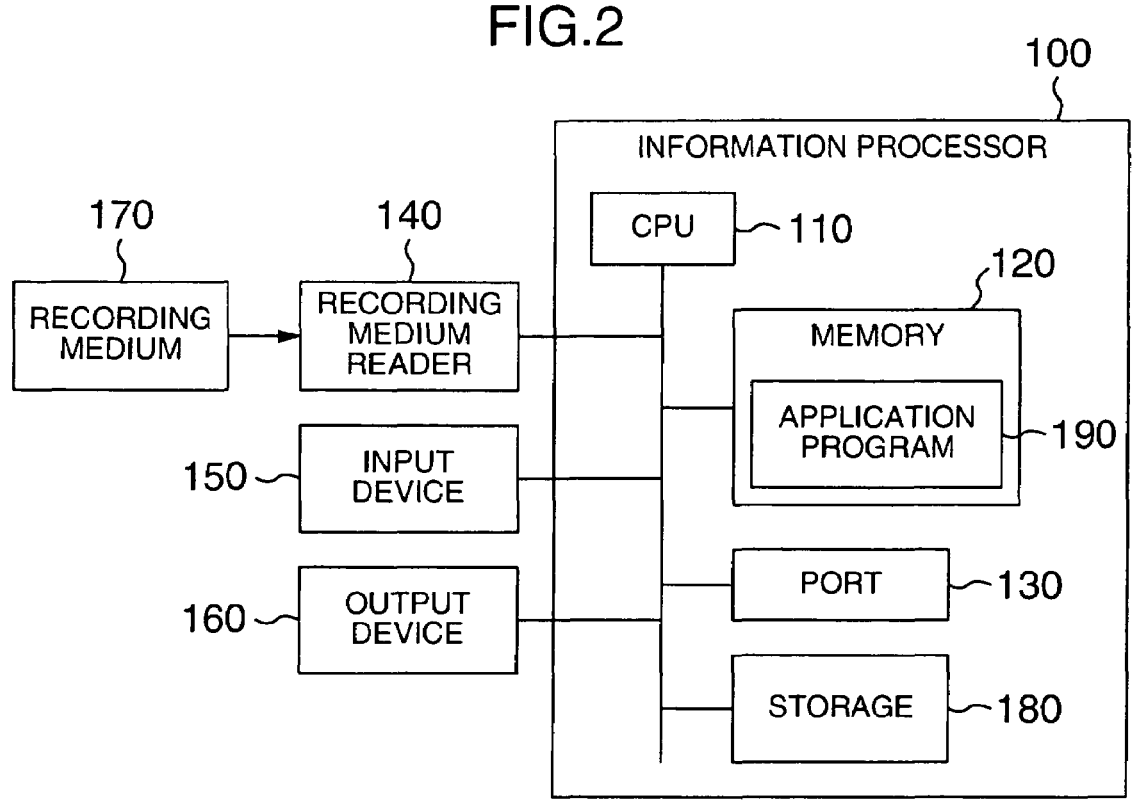
FIG. 2 is a block diagram showing a configuration of an embodiment of an information processor according to the present invention.

FIG. 2 shows in a block diagram a configuration of the information processor 100 of the embodiment. Although the embodiment includes the information processor 0 (100) and the information processor 1 (100), the processors are almost equal in the configuration to each other. Therefore, when it is not particularly required to discriminate each of the processors, the information processor 100 is used as a representative unit thereof.

The information processor 100 includes a central processing unit (CPU) 110, a memory 120, a port 130, a recording medium reader 140, an input device 150, an output device 160, and a storage 170.

The CPU 110 controls the overall operation of the information processor 100 and implements various functions of the embodiment by executing an application program 190 stored in the memory 120. The recording medium reader 140 is a device to read a program and data recorded on a recording medium as the storage 170. The program and the data read by the reader 140 are stored in the memory 120 and/or the storage 170. Therefore, for example, it is possible to read the application program 190 from the recording medium 170 by the reader 140 to store the application program 190 in the memory 120.

The recording medium 170 may be, for example, a flexible disk, a magnetic tape, a compact disk read-only memory (CD-ROM), or a semiconductor memory. The recording medium reader 140 may be integrally disposed in the information processor 100 or may be installed as an external device thereof. The input device 150 is used, for example, for the operator to input data to the information processor 100. The input device 150 may be, for example, a keyboard and/or a mouse. The output device 160 is used to output data to an external device. The output device 160 may be, for example, a display and/or a printer.

The port 130 is a device to conduct communication and serves as a unit to transmit data and to receive data. For example, the communication via the network 300 with the other information processor 100 and that via the network 300 with the storage apparatus 200 are conducted via the port 130. As a result, it is possible to receive the application program 190 from the other information processor 100 to store the program 190 in the memory 120.

The application program 190 is a program to control operation in which a copy of data stored in the storage apparatus 0 (200) is stored in the storage apparatus 1 (200). Details of the program 190 will be described later.

Storage Apparatus

Next, description will be given of the storage apparatus 200 of the embodiment by referring to FIG. 1. Although the embodiment includes the storage apparatus 0 (200) and the storage apparatus 1 (200), the apparatuses are basically equal in configuration to each other. Therefore, when it is not particularly required to discriminate each of the apparatuses, the storage apparatus 200 is used as a representative unit thereof.

The storage apparatus 200 includes a disk controller 210, a disk drive 220, and a control terminal 260.

The disk controller 210 conducts communication between the information processor 100 and the other storage apparatus 200 to execute data input/output processing for the disk drive 220. For example, the disk controller 210 receives a data write request from the information processor 100 and executes data write processing for the disk drive 220. The disk controller 210 includes a CPU 211, a memory 212, a fibre channel interface (FC I/F) 213, and a disk interface 214. The CPU 211 controls the overall operation of the disk controller 210 and implements various functions of the embodiment by executing a control program 215 stored in the memory 212. Moreover, the memory 212 stores, in addition to the control program 215, a difference control table 217 and a logical unit (LU) mapping table 216. Details of the memory 212 will be described later.

The fibre channel interface 213 has an interface function to communicate with the information processor 100 and the other storage apparatus 200 and serves as a unit to transmit data and to receive data. The disk interface 214 has an interface function to communicate data with the disk drive 220 and serves as a unit to execute input/output processing and to write data.

The disk drive 220 includes storage volumes 230 to store data. The storage volumes 230 are storage resources including physical volumes as physical storage areas of a disk drive such as a hard disk drive and logical volumes as storage areas logically assigned to the physical volumes. In FIG. 1, the storage apparatus 0 (200) includes three storage volumes, i.e., logical unit (LU) 01, LU 02, and LU 03 and the storage apparatus 1 (200) includes three storage volumes, i.e., LU 11, LU 12, and LU 13. Moreover, the storage apparatus 200 assigns accessible storage volumes 230 to devices such as the information processor 100 and the other storage 200 which use the storage resources of the storage volumes 230. That is, the storage apparatus 200 conducts the LU number (LUN) masking (to be also referred to as LU mapping). For example, the storage apparatus 1 (200) allows the information processor 1 (100) to access LU 11 and LU 12. The storage apparatus 1 (200) allows the storage apparatus 0 (200) to access LU 12 and LU 13. As a result, when the storage resources of the storage volumes of the storage apparatus 200 are used by a plurality of devices, it is prevented that a third person obtains data from the storage resources and a third person accesses the data without permission.

The control terminal 260 is a computer to maintain and to manage the storage apparatus 200. The control terminal may be incorporated in the storage apparatus 200 or may be connected via a communication network to the storage apparatus 200. The control terminal 260 may also be a computer dedicated to maintain and to manage the storage apparatus 200 or may be a general computer having the maintaining and managing function.

Figure 3:
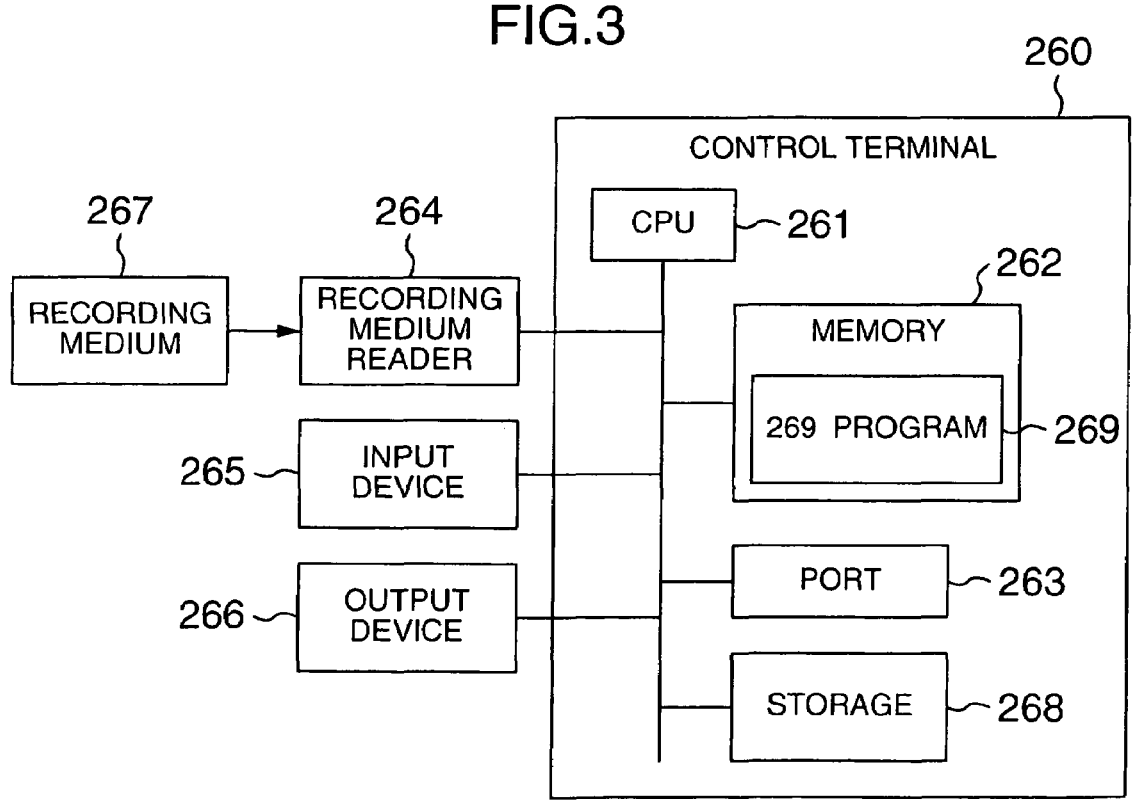
FIG. 3 is a block diagram showing a configuration of an embodiment of a control terminal according to the present invention.

FIG. 3 shows a configuration of the control terminal 260 in a block diagram.

The control terminal 260 includes a CPU 261, a memory 262, a port 263, a recording medium reader 264, an input device 265, an output device 266, and a storage 268.

The CPU 261 controls the overall operation of the control terminal 260 and implements, for example, the maintaining and managing function of the storage apparatus 200 by executing a program 269 stored in the memory 262. The recording medium reader 264 is a device to read a program and data recorded on a recording medium 267. The program and the data read by the reader 264 are stored in the memory 262 and/or the storage 268. Therefore, for example, it is possible that the reader 264 reads the control program 215 from the recording medium 267 to store the program 215 in the memory 262 and/or the storage 268 to transmit the program 215 to the memory 212 of the disk controller 210. The recording medium 267 may be, for example, a flexible disk, a CD-ROM, a magnetic tape, or a semiconductor memory. The recording medium reader 264 may be incorporated in the control terminal 260 or may be installed as an external device thereof. The storage 268 is, for example, a hard disk device or a semiconductor storage device. The input device 265 is used, for example, by the operator to input data to the control terminal 260. The input device 265 may be, for example, a keyboard and/or a mouse. The output device 266 is used to output data to an external device. The output device 266 may be, for example, a display and/or a printer. The port 263 is a device to communicate with the information processor 100 and the storage apparatus 200. As a result, it is possible to receive the control program 215 from the other information processor 100 to transmit the program 215 to the memory 212 of the disk controller 210. The information processor 100 may include the function of the control terminal 260 of the embodiment without using the control terminal 260. In this case, the information processor 100 conducts maintenance and management of the storage apparatus 200.

Logical Unit (LU) Mapping

Figure 4:
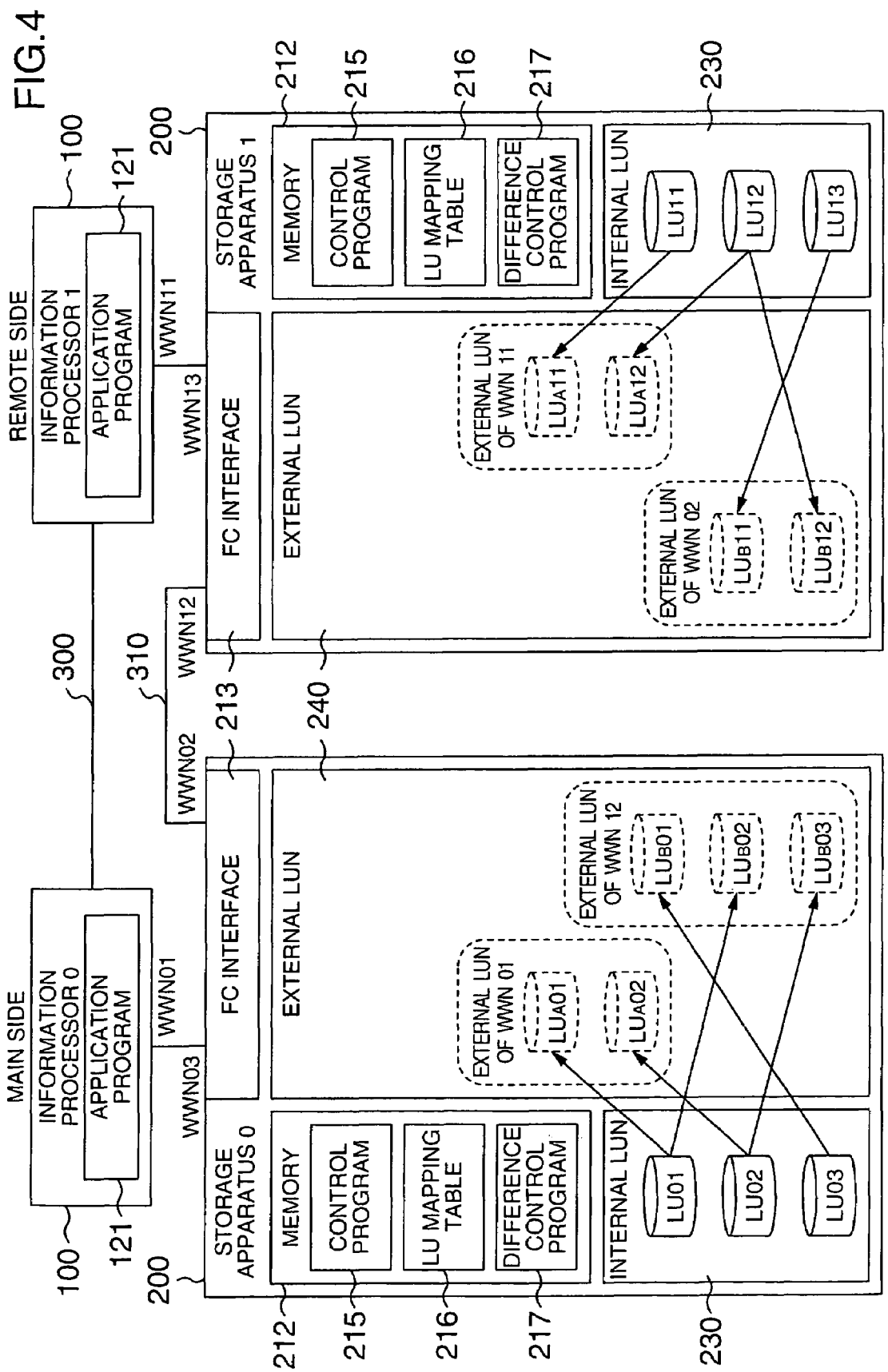
FIG. 4 is a diagram for explaining logical unit (LU) mapping in the embodiment.

FIG. 4 shows operation of the LU mapping in an embodiment of a storage system according to the embodiment.

As described above, the storage apparatus 0 (200) includes three storage volumes, i.e., LU 01, LU 02, and LU 03 and the storage apparatus 1 (200) includes three storage volumes, i.e., LU 11, LU 12, and LU 13. For each of the information processors 0 (100), 1 (100) and the storage apparatuses 0 (200), and 1 (200), a worldwide name (WWN) is defined to conduct communication according to a fibre channel standard. The worldwide names are WWN 01, WWN 02, WWN 03, WWN 11, WWN 12, and WWN 13 in FIG. 4. For example, To send a data input/output request from the information processor 0 (100) to the storage apparatus 0 (200), the information processor 0 (100) describes WWN 01 as information indicating a transmission source and WWN 03 as information indicating a transmission destination in the data input/output request. As a result, the request is sent from the information processor 0 (100) to the storage apparatus 0 (200).

To transmit a data input/output request, it is required to identify a storage volume 230 as an object of the data input or output. As above, since the LU mapping is conducted in the storage apparatus 0 (200), the information processor 0 (100) must identify the storage volume 230 by an identifier assigned thereto to identify the storage volume 230. Specifically, although LU 01 and LU 02 are assigned to the information processor 0 (100) in the example of FIG. 4, identifiers LUA 01 and LUA 02 are assigned for the information processor 0 (100) to identify the respective volumes 230. Therefore, to transmit a data input/output request to LU 02, the information processor 0 (100) describes the identifier LUA 01 in the data input/output request and then transmits the request. Similarly, to transmit a data input/output request to LU 02, the processor 0 (100) describes the identifier LUA 02 in the data input/output request and then transmits the request.

As shown in FIG. 4, the identifier such as LU 01, LU 02, or LU 03 to identify each storage volume 230 of the storage apparatus 200 is also referred to as an internal logical unit number (LUN). Moreover, the identifier such as LUA 01 or LUA 02 assigned to each storage apparatus for the LU mapping is also referred to as an external logical unit number.

As shown in FIG. 4, the storage apparatus 1 (200) assigns LU 01, LU 02, and LU 03 to the storage apparatus 1 (200), and the logical units are identified by identifiers (external LUN), i.e., LUB 02, LUB 03, and LUB 01, respectively.

Similarly, the storage apparatus 1 (200) assigns LU 12 and LU 13 to the storage apparatus 0 (200), and the logical units are identified by identifiers (external LUN) LUB 12 and LUB 13, respectively. The storage apparatus 1 (200) assigns LU 11 and LU 12 to the information processor 1 (100), and the logical units are identified by identifiers (external LUN) LUA 11 and LUA 12, respectively.

These identifiers are controlled by the LU mapping table 216 stored in the memory 212 of the storage apparatus 200. FIG. 5 shows an example of the LU mapping table 216 stored in the memory 212 of the storage apparatus 1 (200).

The LU mapping table 216 includes a WWN column, an external LUN column, and an internal LUN column. The WWN column is used to write a WWN allowed to access a storage volume 230. That is, an actual data input/output is conducted for a data input/output request transmitted from the WWN described in the WWN column. In the example of FIG. 5, WWN 02 indicates the storage apparatus 0 (200) and WWN 11 indicates the information processor 1 (100).

The external LUN column is used to write an identifier assigned to each WWN to identify a storage volume 230 assigned to the WWN.

The internal LUN column is used to write for each external LUN an identifier of a storage volume 230 uniquely assigned in the storage apparatus 200.

Figure 6:
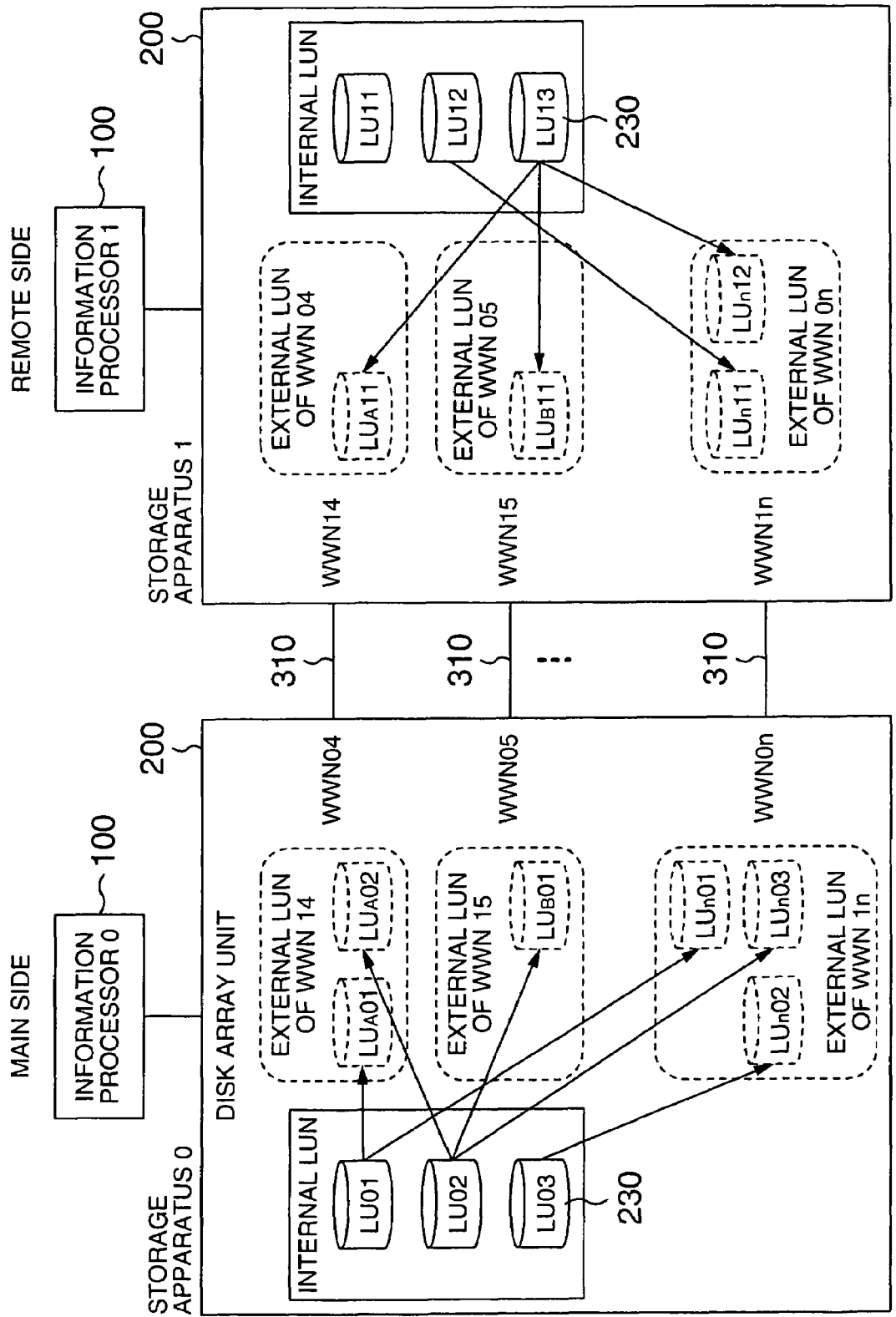
FIG. 6 is a diagram showing operation of a remote copy in the embodiment.

FIG. 6 shows a configuration in which the storage apparatus 0 (200) is connected via a plurality of communication paths to the storage apparatus 1 (200). Also in this case, as described in conjunction with FIG. 4, the LUN mapping is conducted by assigning an external LUN to each WWN. Due to the communication paths between the storage apparatuses 200, even when failure occurs in some transmission paths, the remote copy can be conducted using a normal transmission path. By efficiently using the transmission paths, the period of time required for data transmission between the storage apparatuses 200 can be reduced.

Processing Flow of Remote Copy

Figure 7:
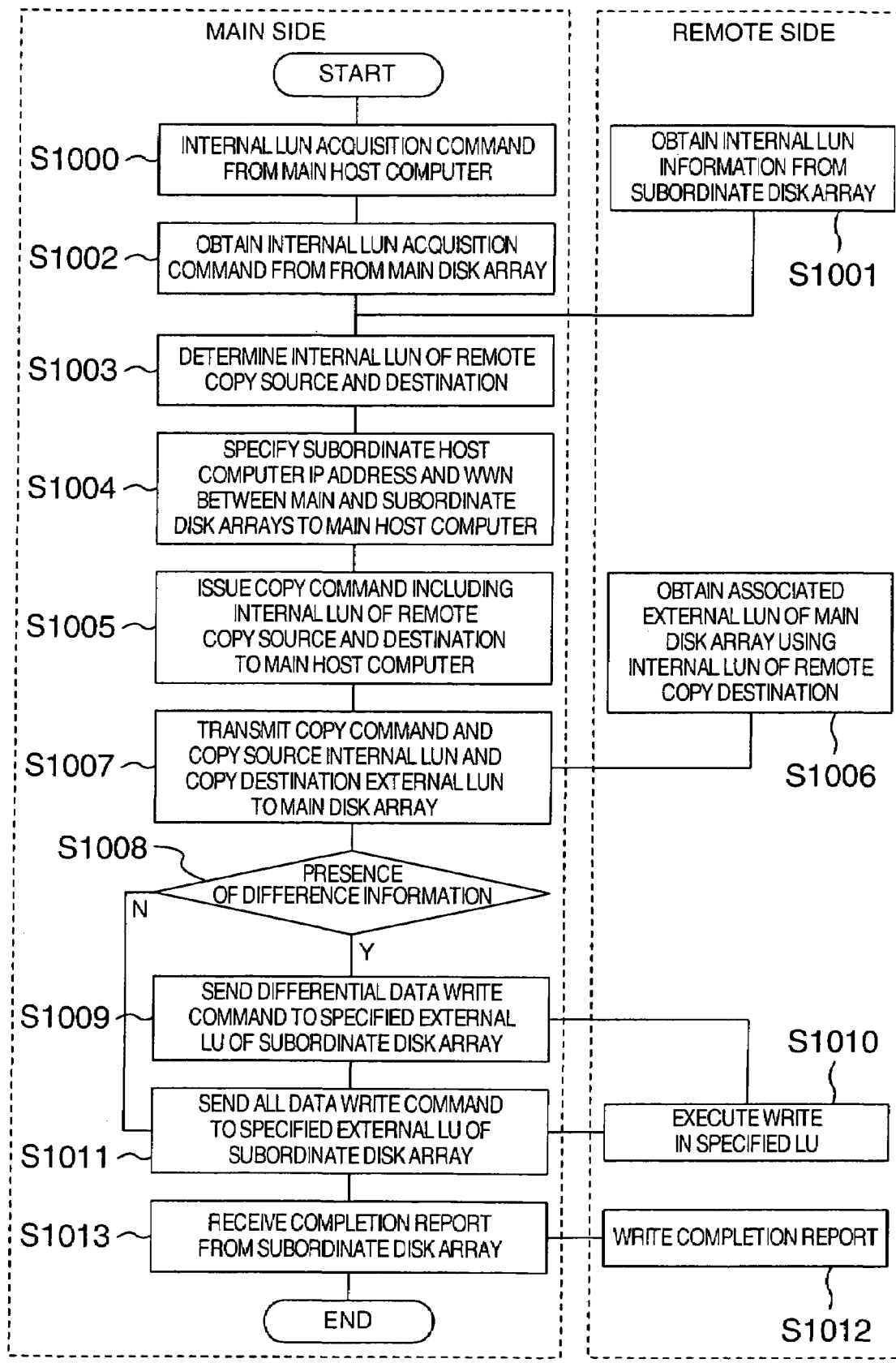
FIG. 7 is a flowchart showing a processing flow of a remote copy in the embodiment.

FIG. 7 shows in a flowchart a processing flow of the remote copy in the embodiment. When the CPU 110 executes the application program 190 including codes or programs to achieve various operations of the embodiment and the CPU 211 executes the control program 215, the processing is implemented as below.

In the remote copy from the storage apparatus 0 (200) to the storage apparatus 1 (200), the operator must specify a storage volume 230 as a copy source in the storage apparatus 0 (200) and a storage volume 230 as a copy destination in the storage apparatus 1 (200). However, the LUN mapping has already been conducted in each storage apparatus 200 in this case, the identifier to identify a storage volume varies depending on an apparatus which identifies the storage volume. Therefore, each of the storage volumes 230 respectively of the copy source and destination is identified by an internal LUN of a storage apparatus 200 associated with the storage volume 230.

First, the information processor 0 (100) obtains an internal LUN of a storage volume 230 of the associated storage apparatus 200. For this purpose, the information processor 0 (100) sends an internal LUN acquisition request to the storage apparatus 0 (200) (S1000). Simultaneously, the information processor 0 (100) sends an internal LUN acquisition request via the first network 300 to the information processor 1 (100) (S1000). The storage apparatus 0 (200) then refers to the LU mapping table 216 and sends to the information processor 0 (100) all internal LUN and external LUN assigned thereto for the information processor 0 (100). Therefore, the information processor 0 (100) can obtain the internal LUN in the storage apparatus 0 (200) (S1002).

On the other hand, the information processor 1 (100) transmits an internal LUN acquisition request to the storage apparatus 1 (200). Then, the storage apparatus 1 (200) refers to the LU mapping table 216 and sends to the information processor 1 (100) all internal LUN and external LUN assigned thereto for the information processor 1 (100). The information processor 1 (100) transmits to the information processor 0 (100) all internal LUN of the storage apparatus 1 (200) and the external LUN assigned thereto for the information processor 1 (100). As a result, the information processor 0 (100) can receive the internal LUN in the storage apparatus 1 (200) (S1001). When the storage apparatuses 0 (200) and 1 (200) are of the same unit type, it is also possible that the storage apparatus 0 (200) transmits to the storage apparatus 1 (200) a transmission request for the internal LUN of the storage volumes in the storage apparatus 1 (200).

Next, the operator determines a storage volume 230 as a copy source and a storage volume 230 as a copy destination (S1003) and then issues a remote copy indication to the information processor 0 (100) (S1004, S1005). Assume in the description of this operation that a copy of data stored in LU 02 of the storage apparatus 0 (200) is determined to be stored in LU 13 of the storage apparatus 1 (200). The remote copy indication from the operator includes specifications of an internet protocol (IP) address of the information processor 1 (100), an internal LUN (LU 02) of the copy source storage volume 230, an internal LUN (LU 13) of the copy destination storage volume 230, and WWN (WWN 02 and WWN 12) respectively connecting the storage apparatuses 0 (200) and 1 (200).

When the storage apparatus 1 (200) as the data copy destination, the copy destination storage volume 230, and the copy destination storage volume 230 are frequently changed, the specifications may be set for each copy using, for example, a graphical user interface (GUI) and a character user interface (CUI) of the input device 150 and the output device 160 of the information processor 0 (100). On the other hand, when the storage apparatus 1 (200) as the data copy destination, the copy destination storage volume 230, and the copy destination storage volume 230 are rarely changed, it is effective that these information items are stored, for example, in the memory 120 of the information processor 0 (100) such that the information items are referred to when a remote copy indication is received from the operator.

It is also possible that S1004 and S1005 are executed at the same time or separately. When the steps are separately executed, S1004 is first executed to establish a transfer path between the storage apparatus 0 (200) and the storage apparatus 1 (200). As a result, even when failure occurs in the transfer path, the failed section can be easily determined in a narrow range. As shown in FIG. 6, a plurality of transfer paths may be disposed between the storage apparatus 0 (200) and the storage apparatus 1 (200).

Next, the information processor 0 (100) issues via the first network 300 to the information processor 1 (100) an acquisition request for external LUN assigned by the storage apparatus 1 (200) to the storage apparatus 0 (200) (S1006). The external LUN acquisition request includes an IP address of the information processor 1 (100), WWN 02 as WWN of the storage apparatus 0 (200) for the storage apparatus 1 (200), and LUN 13 as the internal LUN of the copy destination storage volume 230. In response thereto, the information processor 1 (100) transmits to the storage apparatus 1 (200) an acquisition request for the external LUN assigned by storage apparatus 1 (200) to the storage apparatus 0 (200). The storage apparatus 1 (200) refers to the LU mapping table 216 and then sends to the information processor 1 (100) the external LUN (LUB 11) assigned by the storage apparatus 1 (200) to the storage apparatus 0 (200). The information processor 1 (100) transmits to the information processor 0 (100) the external LUN (LUB 11) assigned by storage apparatus 1 (200) to the storage apparatus 0 (200). As a result, the information processor 0 (100) can acquire the external LUN (LUB 11) assigned by storage apparatus 1 (200) to the storage apparatus 0 (200) (S1006). As shown in FIG. 6, when a plurality of transfer paths are disposed between the storage apparatus 0 (200) and the storage apparatus 1 (200), an external LUN is assigned to each WWN determined for each transfer path. Therefore, each associated external LUN is similarly acquired.

When the storage apparatuses 0 (200) and 1 (200) are of the same unit type, it is also possible in S1006 to acquire WWN (WWN 12) of the storage apparatus 1 (200) specified when the remote copy indication is issued to the information processor 0 (100) in S1004 and S1005 for the following reasons. When the storage apparatus 1 (200) refers to the LU mapping table 216 in S1006 to transmit to the information processor 1 (100) the external LUN (LUB 11) assigned by the storage apparatus 1 (200) to the storage apparatus 0 (200), WWN 12 as WWN of the storage apparatus 1 (200) can also be transmitted.

Next, the information processor 0 (100) sends a remote copy execution request to the storage apparatus 0 (200) (S1007). The request includes the internal LUN (LU 02) of the copy source storage volume 230 and the external LUN of the copy destination storage volume 230 (i.e., an identifier to identify a second storage volume in the second storage apparatus and an identifier to identify a particular second storage volume in the second storage apparatus; LUB 11). The remote copy execution request may be "extended copy command" specified by the SCSI standard or a command of the producer of the storage apparatus 200. When the "extended copy command" is used to copy a large volume of data, a timeout error may occur depending on cases. In such a case, the data is subdivided into data having an amount not causing the timeout error to send the "extended copy command" for each of the subdivided data.

Figures 8, 9:
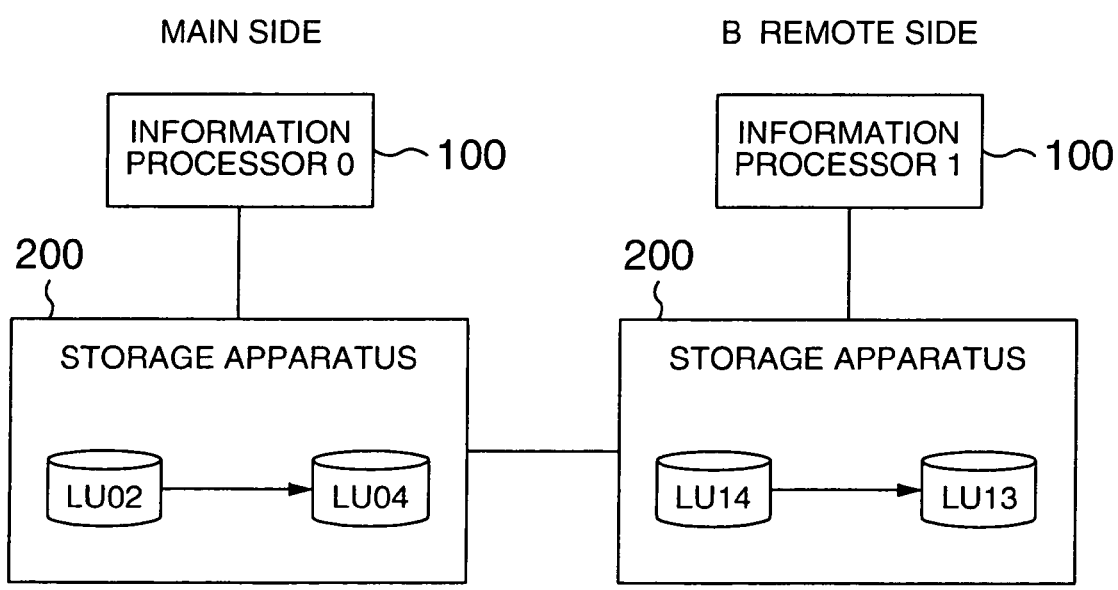
FIG. 8 is a diagram showing a difference control table in the embodiment.
FIG. 9 is a diagram showing operation of a remote copy in the embodiment.

Having received the remote copy execution request, the storage apparatus 0 (200) refers to the difference control table 217 (S1008). The table 217 is used to control data which is selected from the data stored in the storage volume 230 specified as a copy destination and which is not reflected (not written) in the copy destination storage volume 230. That is, when data stored in the copy source storage volume 230 is updated after the previous remote copy, the event of update is recorded in the difference control table 217. As a result, when a remote copy execution request is received, only the data updated as above can be transmitted to the copy destination storage volume 230. Therefore, it is possible that when the remote copy execution request is received, the storage apparatus 200 does not transmit all data of the copy source storage volume 230 to the copy destination storage volume 230 but transmits thereto only the data not reflected yet therein to the copy destination storage volume 230. FIG. 8 shows the difference control table 217 of the embodiment.

As shown in FIG. 8, the difference control table 217 is configured as a bit map. Each bit is represented by specifying (xpi,ypi) (i,j=1, 2, . . . ). The bit corresponds to, for example, a block or a track as a data storage unit of a copy source storage volume 230. For example, when each bit corresponds to one track, the value of a bit identified by [xpi,ypi] corresponds to, for example, a track uniquely determined by a cylinder number xpi and a head number ypi of the storage volume 230. When the bit value is "0", it is indicated that the associated data is beforehand reflected in the copy destination storage volume 230. When the bit value is "1", it is indicated that the associated data is not yet reflected therein. When all bits of the table 217 are "0" at reception of the remote copy execution request, a copy of all data of the copy source storage volume 230 is produced in the copy destination storage volume 230. It is also possible that the difference control table 217 is not used and all data of the storage volume 230 specified as the copy source is transmitted to the storage apparatus 1 (200) each time the remote copy execution request is received from the information processor 0 (100).

By referring to the difference control table 217 in S1008, if it is determined that data not reflected in the copy destination storage volume 230 is present, the storage apparatus 0 (200) describes LUB 11 as an identifier to identify the copy destination storage volume 230 in a data input/output request and then transmits the request to the storage apparatus 1 (200) (S1009). LUB 11 is an external LUN and hence can be described using a small number of bits. Therefore, a write command specified by the SCSI standard can be used for the data input/output request. Since the write command specified by the SCSI standard is a command standardized independently of difference in the unit type and the producer of the storage apparatus 200, the remote copy can be conducted between the storage apparatuses different in the unit type and the producer from each other.

When the "write command" is used for a large volume of data, a timeout error may occur depending on cases. In such a case, the data is subdivided into data having an amount not causing the timeout error to send the "write command" for each of the subdivided data.

On the other hand, if it is determined by referring to the table 217 that all bits of the difference control table 217 are "0", the process goes to S1011. The storage apparatus 0 (200) then describes LUB 11 as an identifier to identify the copy destination storage volume 230 in a data input/output request and transmits the request to the storage apparatus 1 (200) (S1011).

Having received the data input/output request from the storage apparatus 0 (200), the storage apparatus 1 (200) executes data input/output processing for the storage volume 230 identified as a copy destination storage volume 230.

When data input/output request is a write command, data write processing is executed (S1010). In this operation, it is also possible to confirm, according to an indication from the information processor 0 (100), a state of progress of the remote copy, that is, a state of data write progress in the copy destination storage volume 230.

When the data input/output processing is completed, the storage apparatus 1 (200) sends a completion report to the storage apparatus 0 (200) (S1012). By receiving the completion report, the storage apparatus 0 (200) can recognize that the remote copy has normally finished. This terminates a sequence of operations of the remote copy.

Description of the embodiment has been given of the processing to write data from the storage apparatus 0 (200) in the storage apparatus 1 (200). However, when the storage apparatus 0 (200) reads data stored in the storage apparatus 1 (200), the processing flow is almost the same as above.

The storage volume 230 as the data source and the storage volume 230 as the data destination are ordinarily used by the information processor 100 to provide information processing services. In this case, when the data input/output frequency of the storage volumes 230 increases due to the remote copy processing, the data access from the information processor 100 to the storage volumes 230 is delayed. This deteriorates the information processing services. The storage apparatus 0 (200) controls using the difference control table 217 the data not reflected in the copy destination storage volume 230. However, only by disposing the table 217 in the storage apparatus 0 (200), the difference control cannot be conducted when data stored in the copy destination storage volume 230 is changed. Assume that the storage apparatuses 0 (200) and 1 (200) are of the same unit type. The difference information can be exchanged therebetween by mutually disposing the difference control table 217. However, this is not possible when the storage apparatuses 0 (200) and 1 (200) are not of mutually different unit types. To overcome this difficulty, the storage volumes 230 are controlled in two kinds, namely, as storage volumes for remote copy and as storage volumes for information processing services in the remote copy source and destination as shown in FIG. 9.

In FIG. 9, during a period of time in which the remote copy from the storage apparatus 0 (200) to the storage apparatus 1 (200) is not conducted, the information processors 0 (100) and 1 (100) appropriately update the contents of LU 02 and LU 13 using LU 02 (a particular one of the first storage volumes) and LU 13 (a second particular one of the second storage volumes).

In the operation, the storage apparatus 0 (200) forms a pair of LU 02 and LU 04 (a second particular one of the first storage volumes) such that when the information processor 0 (100) writes data in LU 02, a control operation is conducted to write a copy of the data also in LU 04. As a result, the contents stored in LU 02 are equal to those stored in LU 04 by the control operation.

On the other hand, the storage apparatus 1 (200) also forms a pair of LU 14 (a first particular one of the second storage volumes) and LU 13.

At reception of a remote copy request from the information processor 0 (100), the storage apparatus 0 (200) stops the operation, which is conducted when data from the information processor 0 (100) is written in LU 02, to write a copy of the data in LU 04.

When the remote copy request received by the storage apparatus 0 (200) is a request to store a copy of data written in LU 02 in LU 14, a copy of data stored in LU 04 paired with LU 02 is written in LU 14.

When the data copy onto LU 14 is completed, the storage apparatus 0 (200) starts again the control operation to equalize the contents stored in LU 02 to those stored in LU 04. On the other hand, the storage apparatus 1 (200) writes a copy of data written in LU 14 in LU 04.

As above, the storage volume 230 for the remote copy and that used by the information processor 100 are separately controlled. Therefore, the remote copy can be conducted without deteriorating the information processing services. Also when data stored in a storage volume of a storage apparatus in the remote site is changed, the remote copy can be conducted using the difference control table 217.

As described above, according to the embodiment, a storage apparatus installed in a main site can acquire an identifier (external LUN) locally assigned to a storage apparatus installed in a local site to identify a storage volume of the storage apparatus in the local site. Therefore, it is possible to describe an external LUN in a data input/output request for a remote copy to identify a copy destination storage volume.

It is therefore possible to use, in a data input/output request for a remote copy, a standardized command such as a write command specified, for example, by the SCSI standard. As a result, a user having various storage apparatuses in various locations can conduct the remote copy by freely configuring pairs of storage apparatuses. When a storage apparatus is additionally installed in a remote site, it is possible to select a storage apparatus most suitable for needs regardless of the unit types of the storage apparatuses installed in the main site.

According to the embodiment, the remote copy is conducted using the difference control table. As a result, it is possible that the storage apparatus does not transmit all data stored in a copy source storage volume to a copy destination for each copy but transmits only the data not reflected in the copy destination storage volume. Therefore, the period of time required for the remote copy can be reduced.

The storage volumes used for the remote copy are separated from those used by the information processors, and hence the remote copy can be conducted without deteriorating the information processing services. Even when data stored in a storage volume of a storage apparatus in a remote side is changed, the remote copy can be conducted using the difference control table.

Since an information processor installed in a main site desiring to issue a remote copy execution indication to a storage apparatus can acquire an internal LUN of each storage apparatus in the main and remote sites, the operator can conduct the remote copy only by issuing a remote copy indication to the information processor in the main site.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A storage system comprising:
   a first disk array system, in a primary site, coupled to a first host computer, comprising:
   a plurality of first disk drives,
   a first volume configured by some of said first disk drives, and
   a first controller storing data sent from said first host computer in said first volume and transferring copy data of said data sent from said first host computer with a remote copy procedure; and a second disk array system, in a remote site, coupled to said first disk array system and a second host computer, comprising:

a plurality of second disk drives, a second volume configured by some of said second disk drives, and a second controller receiving said copy data from said first disk array system with said remote copy procedure and storing said copy data in said second volume, wherein said second volume is related to a first Logical Unit Number (LUN), which is used to access said second volume by said second host computer, and a second LUN, which is used for transferring said copy data from said first disk array system to said second volume with said remote copy procedure.

2. A storage system according to claim 1, wherein said first controller sends said copy data to said second LUN of said second disk array system, and wherein said second disk array system receives said copy data with said remote copy procedure and stores said copy data in said second volume based on a relationship between said second LUN and said second volume.

3. A storage system according to claim 1, wherein said first controller addresses said second LUN for transferring said copy data with said remote copy procedure.

4. A storage system according to claim 1, wherein said first controller requests said second LUN from said second controller.

5. A storage system according to claim 1, wherein said first controller requests said second LUN from a management apparatus which is connected to said first disk array system.

6. A storage system comprising:

a first disk array system, in a primary site, coupled to a first host computer, comprising:

a plurality of first disk drives, a plurality of first volumes configured by said first disk drives, and a first controller storing data sent from said first host computer in said first volumes and transferring data related to said first volumes with a remote copy procedure; and a second disk array system, in a remote site, coupled to said first disk array system and a second host computer, comprising:

a plurality of second disk drives, a second plurality of volumes configured by said second disk drives, and a second controller receiving said data related to said first volumes with said remote copy procedure and storing said received data in said second volumes, wherein each of said second volumes is related to a first Logical Unit Number (LUN), which is used to access said second volume by said second host computer, and a second LUN, which is used for initiating said remote copy procedure.

7. A storage system according to claim 6, wherein said first controller manages said remote copy procedure per each said second LUN.

8. A disk array system for use in a storage system which includes a first disk array system, in a primary site, coupled to a first host computer, and a second disk array system, in a remote site, coupled to said first disk array system and a second host computer, said disk array system comprising:

a plurality of disk drives;

a volume configured by some of said disk drives; and a controller for controlling said disk array system, wherein if said disk array system is said first disk array system, then said controller stores data sent from said first host computer in said volume and transfers copy data of said data sent from said first host computer with a remote copy procedure;

wherein if said disk array system is said second disk array system, then said controller receives said copy data from said first disk array system with said remote copy procedure and stores said copy data in said volume, and wherein if said disk array system is said second disk array system, then said volume is related to a first Logical Unit Number (LUN), which is used to access said volume by said second host computer, and a second LUN, which is used for transferring said copy data from said first disk array system to said volume with said remote copy procedure.

9. A disk array system according to claim 8, wherein if said disk array system is said first disk array system, said controller sends said copy data to said second LUN of said second disk array system, and wherein said second disk array system receives said copy data with said remote copy procedure and stores said copy data in said second volume based on a relationship between said second LUN and said second volume.

10. A disk array system according to claim 8, wherein if said disk array system is said first disk array system, said controller addresses said second LUN for transferring said copy data with said remote copy procedure.

11. A disk array system according to claim 8, wherein if said disk array system is said first disk array system, said controller requests said LUN from said second controller of said second disk array system.

12. A disk array system according to claim 8, wherein if said disk array system is said first disk array system, said controller requests said second LUN from a management apparatus which is connected to said first disk array system.

13. A disk array system for use in a storage system which includes a first disk array system, in primary site, coupled to a first host computer, and a second disk array system, in a remote site, coupled to said first disk array system and a second host computer, said disk array system comprising:

a plurality of disk drives;

a plurality of volumes configured by said disk drives; and a controller for controlling said disk array system, wherein if said disk array system is said first disk array system, then said controller stores data sent from said first host computer in said volumes and transfers data related to said volumes with a remote copy procedure, wherein if said disk array system is said second disk array system, then said controller receives said data related to said volumes with said remote copy procedure and stores said received data in said volumes, and wherein if said disk array system is said second disk array system, then said each of said volumes is related to a first Logical Unit Number (LUN), which is used to access said volumes by said second host computer, and a second LUN, which is used for initiating said remote copy procedure.

14. A disk array system according to claim 13, wherein if said disk array system is said first disk array system, said controller manages said remote copy procedure per each second LUN.

* * * * *